United States Patent
Shan

(10) Patent No.: US 10,892,105 B2
(45) Date of Patent: Jan. 12, 2021

(54) MULTI-LAYER CAPACITOR PACKAGE

(71) Applicant: International Business Machines Corporation, Armonk, NY (US)

(72) Inventor: Lei Shan, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/420,147

(22) Filed: Jan. 31, 2017

(65) Prior Publication Data

US 2018/0218841 A1    Aug. 2, 2018

(51) Int. Cl.
| | |
|---|---|
| H01G 4/38 | (2006.01) |
| H01G 4/12 | (2006.01) |
| H01G 4/012 | (2006.01) |
| H01G 4/232 | (2006.01) |
| H01G 4/30 | (2006.01) |
| H01G 4/33 | (2006.01) |

(52) U.S. Cl.
CPC .............. *H01G 4/38* (2013.01); *H01G 4/012* (2013.01); *H01G 4/1227* (2013.01); *H01G 4/232* (2013.01); *H01G 4/30* (2013.01); *H01G 4/33* (2013.01)

(58) Field of Classification Search
CPC ........ H01G 4/38; H01G 4/012; H01G 4/1227; H01L 21/4857; H01L 21/486; H01L 23/49822; H01L 23/49827; H01L 23/49838
USPC ......................................................... 361/303
See application file for complete search history.

(56) References Cited

U.S. PATENT DOCUMENTS

| | | |
|---|---|---|
| 6,346,743 B1 | 2/2002 | Figueroa et al. |
| 6,429,484 B1 | 8/2002 | Yu |
| 6,795,295 B2 | 9/2004 | Murakami et al. |
| 7,821,770 B2 | 10/2010 | Nishikawa et al. |
| 7,989,895 B2 | 8/2011 | White et al. |

(Continued)

FOREIGN PATENT DOCUMENTS

WO    2016099570 A1    6/2016

OTHER PUBLICATIONS

Garner et al., "Challenges for dielectric materials in future integrated circuit technologies," Elsevier, Science Direct, Microelectronics Reliability 45 (2005) 919-924, Copyright 2004 Elsevier Ltd., 6 pages www.elsevier.com/locate/microrel.

(Continued)

*Primary Examiner* — Michael P McFadden
(74) *Attorney, Agent, or Firm* — Jared C. Chaney

(57) ABSTRACT

The present invention provides a substrate assembly includes at least two ceramic layers, at least two layers of one or more electrodes, at least one high dielectric constant layer, two or more holes, electrically conductive structures formed in the two or more holes, and the electrically conductive structure is physically connected to at least one of the electrodes, thereby forming a set, wherein each of the sets if physically separated from at least one of the other sets. A process includes cutting ceramic sheets, removing material from the ceramic sheets to form holes, depositing a metallic material into the holes, depositing the metallic material to form electrodes, selectively depositing a thin layer of high dielectric constant material, and firing the ceramic sheets, the metallic material, the high dielectric constant material layer, and the electrodes.

7 Claims, 15 Drawing Sheets

(56) References Cited

U.S. PATENT DOCUMENTS

| | | |
|---|---|---|
| 8,564,967 B2 | 10/2013 | Amey, Jr. et al. |
| 8,766,379 B2 | 7/2014 | Liu et al. |
| 9,129,745 B2 | 9/2015 | Suzuki et al. |
| 2002/0085334 A1 | 7/2002 | Figueroa et al. |
| 2010/0271752 A1 | 10/2010 | Ishida et al. |
| 2014/0022694 A1 | 1/2014 | Reynolds et al. |
| 2015/0022944 A1 | 1/2015 | Lee et al. |
| 2016/0093442 A1* | 3/2016 | Nagamoto ............... H01G 4/30 361/301.4 |
| 2017/0194419 A1* | 7/2017 | Lee ........................ H01C 17/28 |

OTHER PUBLICATIONS

Shan, "Multi-Layer Capacitor Package," U.S. Appl. No. 15/896,224, filed Feb. 14, 2018.
List of IBM Patents or Patent Publications Treated as Related, dated Feb. 7, 2018, 2 pages.
"Accelerated Examination Support Document," International Business Machines Corporation, dated Feb. 7, 2018, 19 pages.

* cited by examiner

US 10,892,105 B2

MULTI-LAYER CAPACITOR PACKAGE

BACKGROUND

The present invention relates to capacitors, and more particularly to multi-layer capacitor packages.

SUMMARY

The present invention provides a multi-layer capacitor package. The present invention provides a substrate assembly including: a first ceramic layer, a first layer of one or more electrodes connected to the ceramic layer, a high dielectric constant layer connected to the first layer of one or more electrodes, a second layer of one or more electrodes connected to the high dielectric constant layer, a second ceramic layer connected to the second layer of one or more electrodes, two or more holes, the holes are formed through the first ceramic layer, at least one electrode and, at least one high dielectric constant layer, and the second ceramic layer, electrically conductive structures formed in the two or more holes, and electrically conductive structure is physically connected to at least one of the electrodes and, thereby forming a set, where each of the sets if physically separated from at least one of the other sets. In a further embodiment, the high dielectric constant layer is connected to the first ceramic layer in addition to the first layer of electrodes. In a further embodiment, a second ceramic layer connected to the second layer of one or more electrodes and the high dielectric constant layer.

DETAILED DESCRIPTION

Figure 1A:
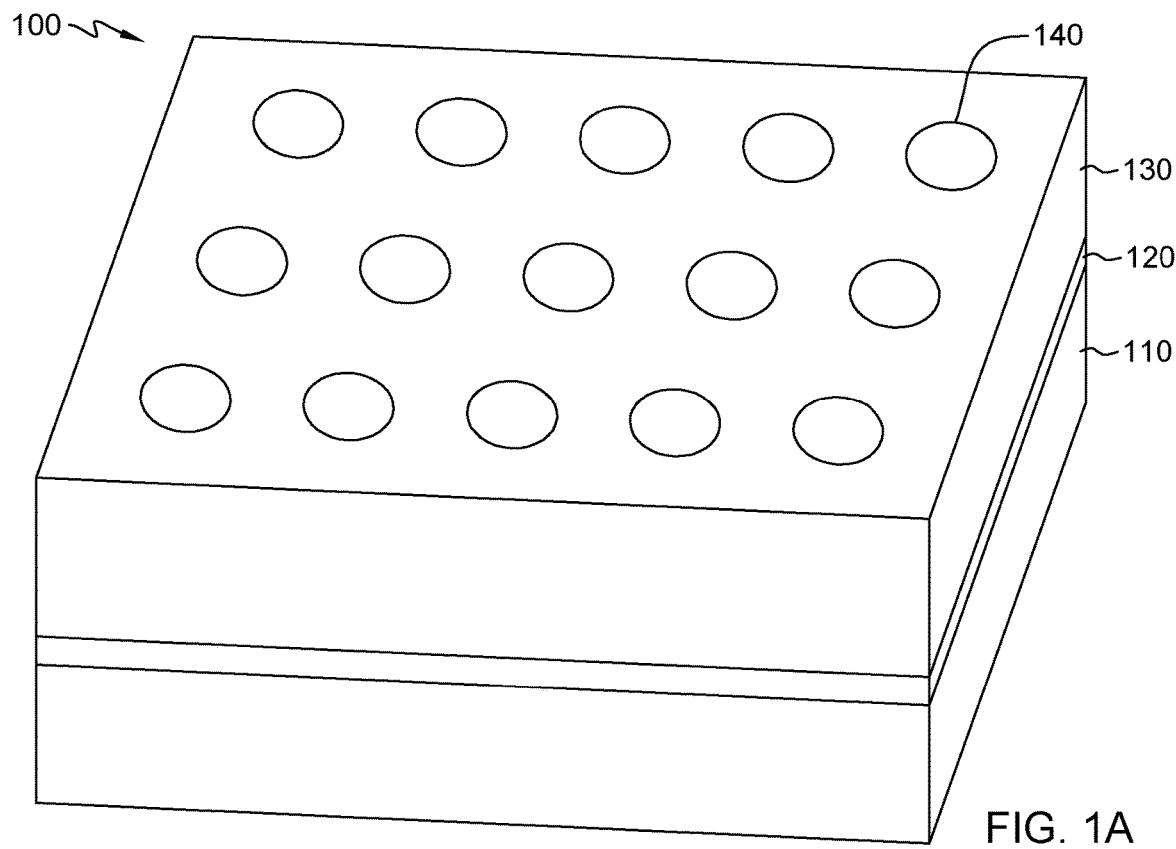
FIG. 1A is a perspective view of a package according to an embodiment of the present invention.
Figure 1B:
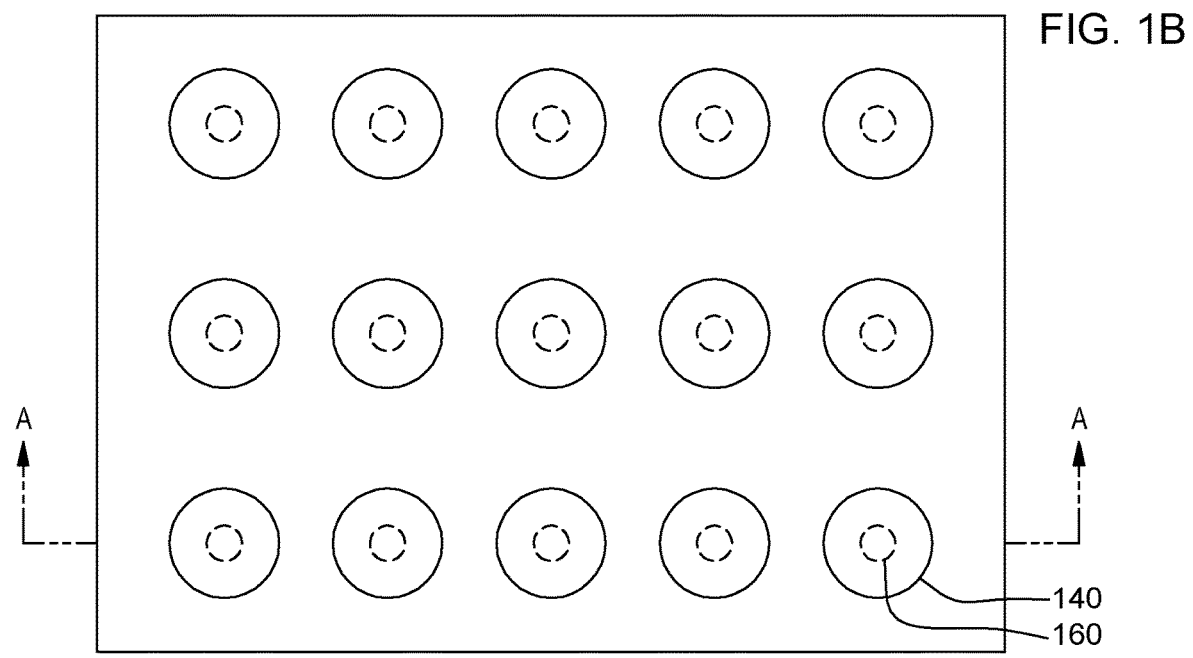
FIG. 1B is a top view of a package according to an embodiment of the present invention.
Figure 1C:
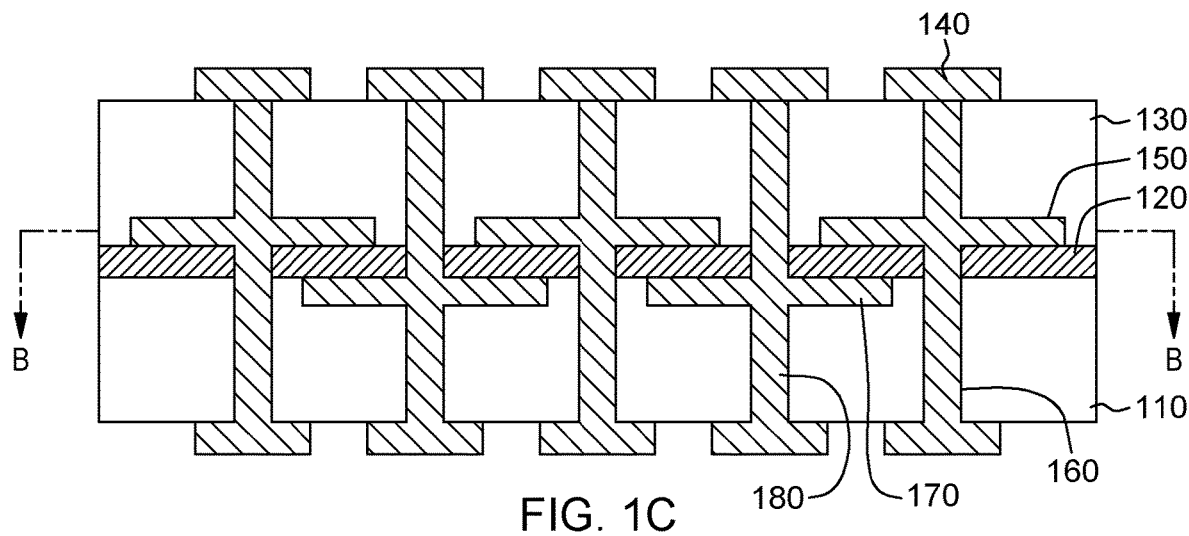
FIG. 1C is a cross-sectional front view a package according to an embodiment of the present invention.
Figure 1D:
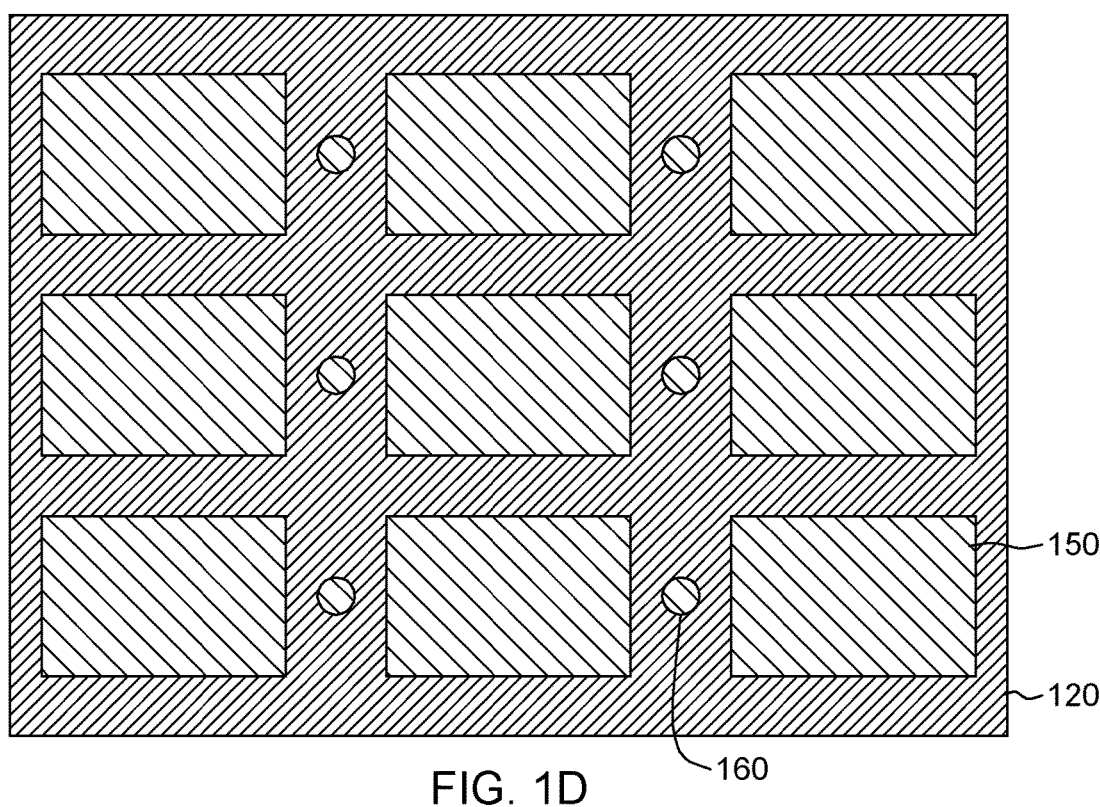
FIG. 1D is a cross-sectional top view a package according to an embodiment of the present invention.

Referring to FIG. 1A, FIG. 1B, FIG. 1C, and FIG. 1D in one embodiment, substrate assembly 100 includes a first ceramic layer 110, a first layer of one or more electrodes 170 connected to ceramic layer 110, a high dielectric constant layer 120 connected to first layer of one or more electrodes 170, a second layer of one or more electrodes 150 connected to high dielectric constant layer 120, a second ceramic layer 130 connected to second layer of one or more electrodes 150, two or more holes 160, where each of two or more holes 160 is formed through at least one ceramic layer 110, 130, at least one layer of one or more electrodes 170, 150, and at least one high dielectric constant layer 120, and electrically conductive structures formed in two or more holes 160, where each of the electrically conductive structures is physically connected to at least one of the electrodes 170, 150, thereby forming sets, where each of the sets is physically separated from at least one of the other sets. In a further embodiment, high dielectric constant 120 layer is connected to first ceramic layer 110 in addition to the layer of electrodes 170. In a further embodiment, second ceramic layer 130 is connected to second layer of one or more electrodes 150 and high dielectric constant layer 120.

The present invention provides a power decoupling mechanism that can be directly attached to the front or the back of any integrated circuit (IC) chip to reduce simultaneous switching power noises, as a cost-effective substitution to on-chip decoupling capacitance. In an exemplary embodiment, the mechanism consists of straight via-to-via translations and relatively simple layer constructions. In an exemplary embodiment, the device is fabricated with low temperature cofired ceramic (LTCC). In a further embodiment, one or more layers of high dielectric constant materials are incorporated with the ceramic attachment, so that highly distributed capacitance can be achieved for power decoupling purpose.

As on-chip deep trench capacitor (DTC) become unusable beyond 14 nm semiconductor technology generation, power noise is becoming a major concern of circuit/system designers. The present invention discloses a ceramic substrate integrated with ultra-high dielectric constant layers for dedicated power decoupling capacitance. The present invention could not only substitute on-chip DTCs by bringing large quantity/value capacitance adjacent to controlled collapse chip connection joints, but also address other major packaging challenges, i.e. improving reliability with a CTE matching intermedia and enabling reworkability for multi-chip configurations. One of the barriers preventing Organic Multi-Component Carrier (OMCC) from being adopted in current high-end systems, is the cost impact due to multi-component assembly yield. Therefore, enabling sub-component reworkability is essential for MCC applications. Low impedance at high frequencies is preferable for power noise reduction. In comparison, the conventional embedded capacitor behaves inductively due to large loop inductance, and therefore is not suitable for multi-GHz and greater frequency applications.

In an embodiment, the ceramic layers are between 50 μm and 60 μm thick. In one embodiment, the ceramic layers are between 25 and 35 mm wide and deep. In an embodiment, the high dielectric constant layer 120 has a thickness ranging from 1 μm to 10 μm thick. In one embodiment, the ceramic sheet is between 1 and 4 cm long and between 1 and 4 cm deep. In an embodiment, the electrodes are 10-20 μm thick.

In an embodiment, the substrate assembly further includes at least one additional layer of one or more electrodes, and one additional high dielectric constant layers. In one embodiment, the substrate assembly further includes at least one additional ceramic layer.

In an embodiment, the package may be created using the variety of layers to necessary to achieve the required capacitance.

In an embodiment, high dielectric constant layer 120 is selected from the group consisting of strontium titanate or barium titanate. In one embodiment, the high dielectric constant material is, in part, fabricated by mixing ceramic particles having a one of a bi-modal distribution of particle sizes and a multi-modal distribution of sizes having a diameter ranging from in the nanometers to in the micrometers within material for physically separating the circuit components and at least a portion of the pins, where a quantity of the ceramic particles is adjusted to control a dielectric constant for a housing of the connector, according to the following formula:

$$\in = [\in_1^{1/3} + v_2(\in_2^{1/3} - \in_1^{1/3})]^3$$

where $\in_1$ represents a dielectric constant of a carrier material, $\in_2$ represents a dielectric constant of ceramic particles, $v_2$ represents a volume fraction of the ceramic particles in the material, and $\in$ represents the dielectric constant of the high dielectric constant material. In one embodiment, the high dielectric constant material is used to jacket circuit components and at least a portion of pins for a dual in-line memory module connector with the mix of particles and material to form the connector housing. In one embodiment, the carrier material is a ceramic material.

In one embodiment, each of the electrically conductive structures includes a conductive metal. In one embodiment, the metal is composed of aluminum, tantalum and niobium. In one embodiment, the composition of the conductive structure varies across the conductive structure in the holes and the electrodes. For example, the conductive structure in the holes could be composed of one metal material and the electrodes could be composed of a second metal material. In another example, the conductive structure in the holes could be composed of one metal material, one layer of electrodes could be composed of a second metal material, and a second layer of electrodes could be composed of a third metal material.

In one embodiment, the assembly further includes an electrically conductive surface(s) pad 140 at a termination of the two or more holes. In one embodiment, the pads are used to facilitate bonding to a chip. In one embodiment, the pads are used for flip chip bonding, also known as controlled collapse chip connection or C4.

In one embodiment, the package further includes an electrically conductive surface pad 140 at the termination of each of two or more conductive pathways. In one embodiment, the surface pads are on both the top and bottom hole terminations, in another embodiment the pads are only on the top termination.

Figure 2A:
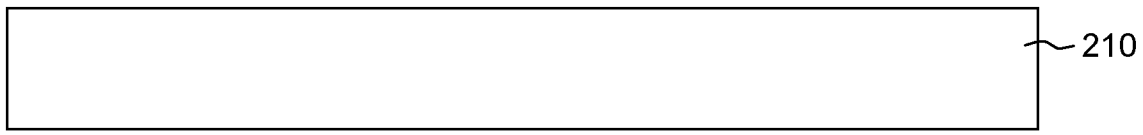
FIG. 2A is a cross-sectional front view a package according to an embodiment of the present invention.
Figure 2B:
FIG. 2B is a top down view of a package according to an embodiment of the present invention.
Figure 2C:
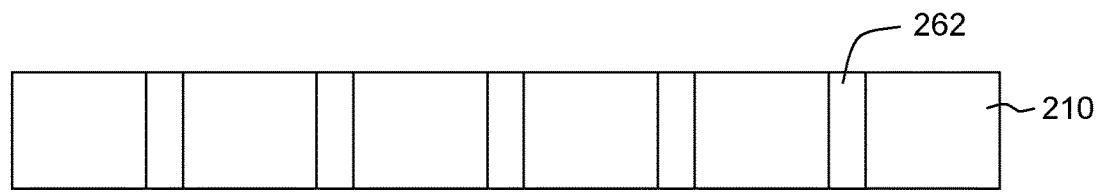
FIG. 2C is a cross-sectional front view a package according to an embodiment of the present invention.
Figure 2D:
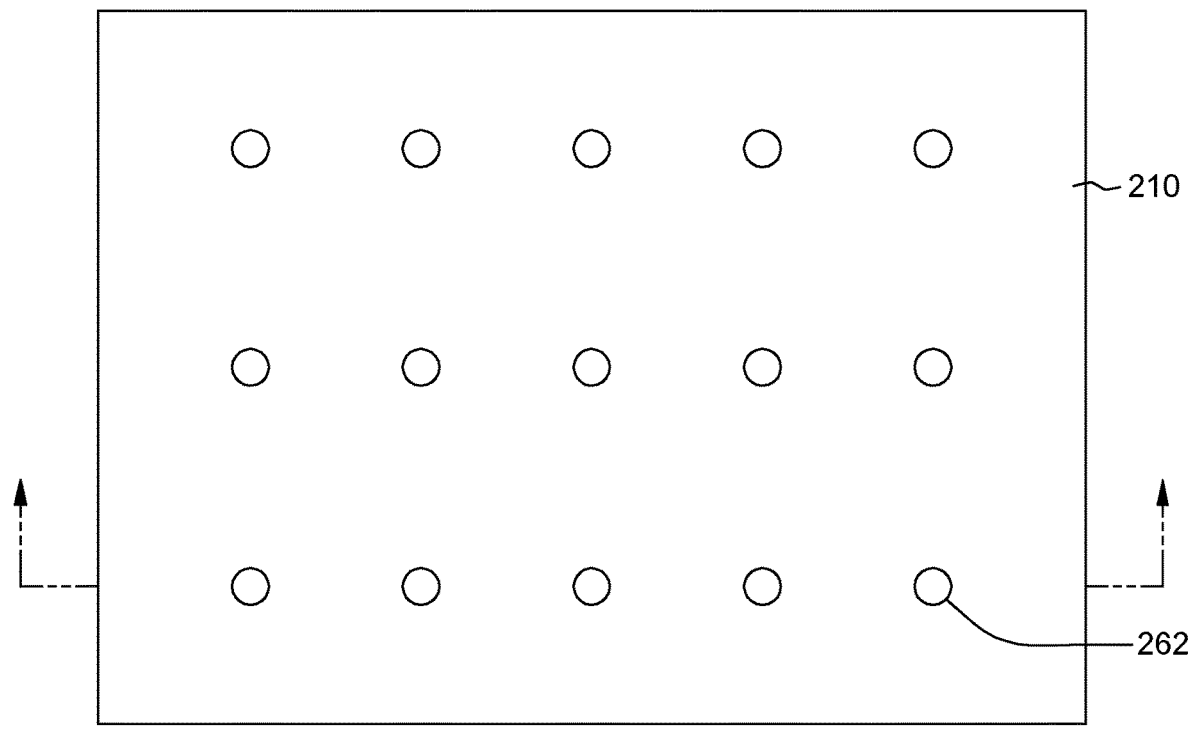
FIG. 2D is a top down view of a package according to an embodiment of the present invention.
Figure 2E:
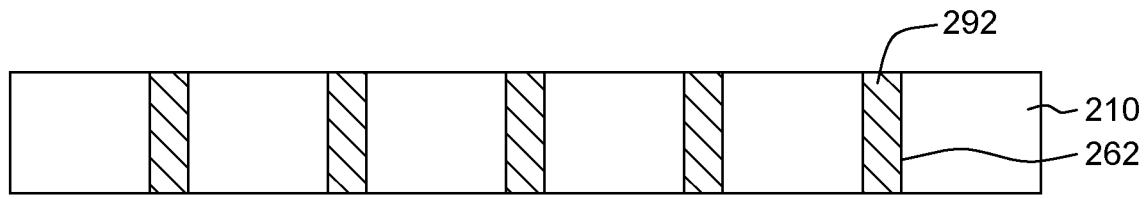
FIG. 2E is a cross-sectional front view a package according to an embodiment of the present invention.
Figure 2F:
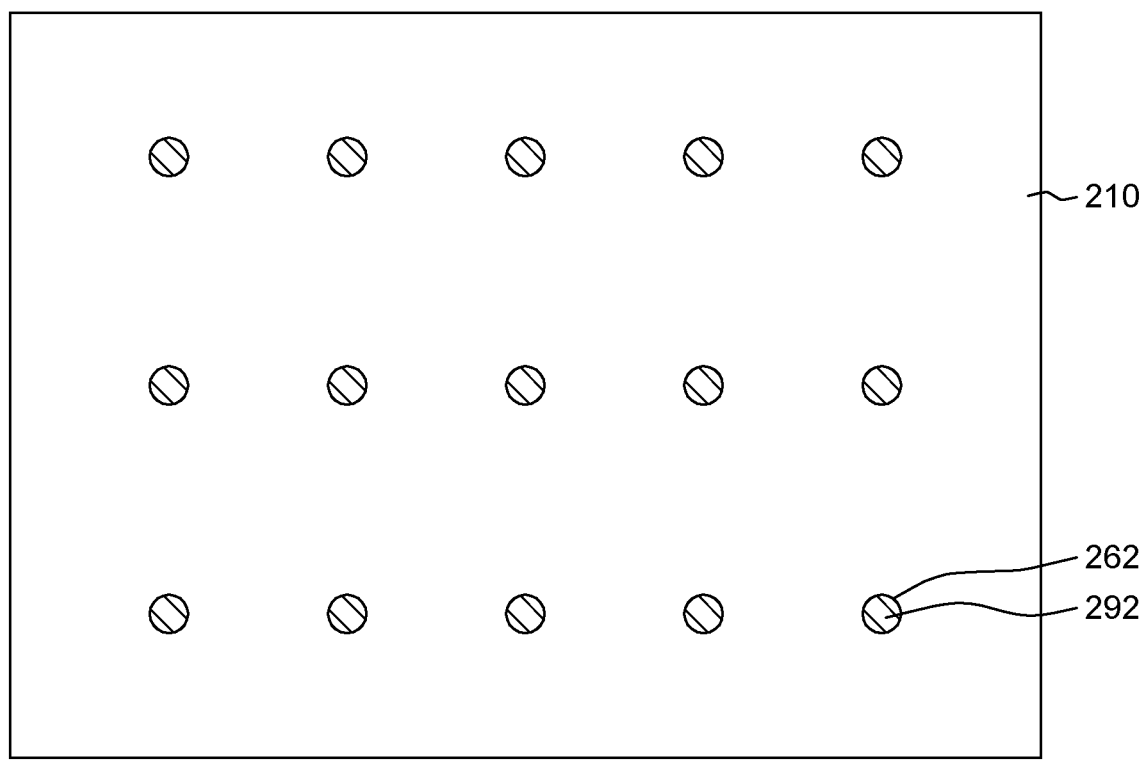
FIG. 2F is a top down view of a package according to an embodiment of the present invention.
Figure 2G:
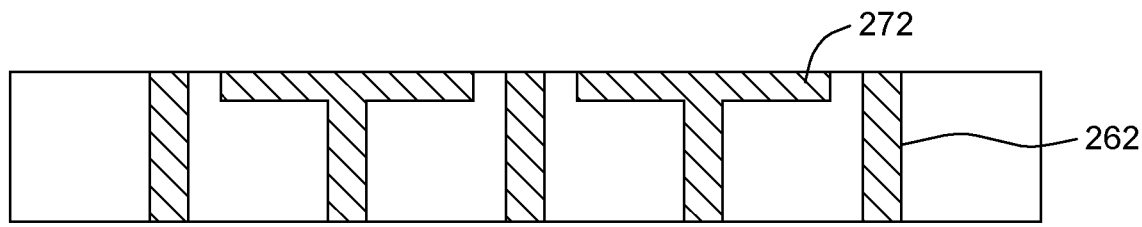
FIG. 2G is a cross-sectional front view a package according to an embodiment of the present invention.
Figure 2H:
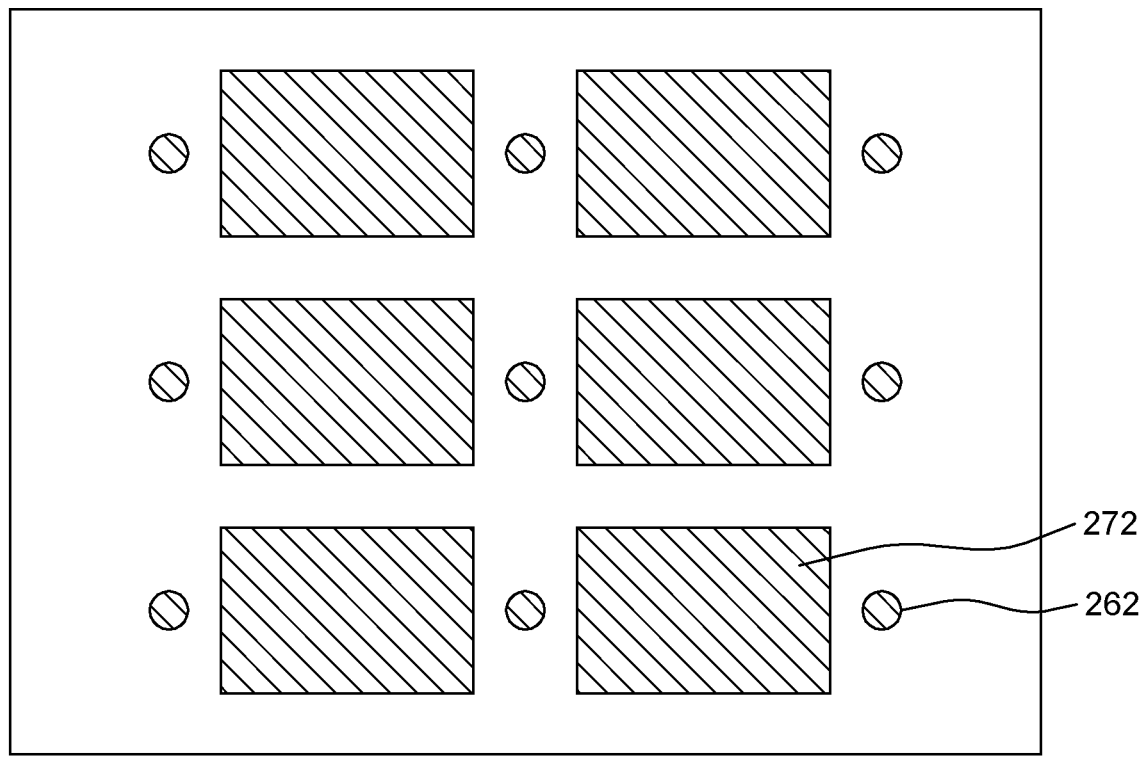
FIG. 2H is a top down view of a package according to an embodiment of the present invention.
Figure 2I:
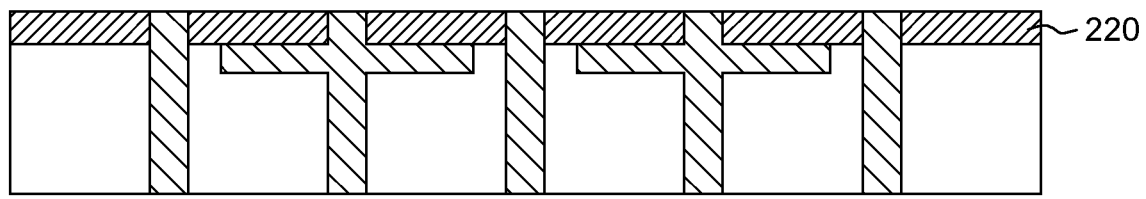
FIG. 2I is a cross-sectional front view a package according to an embodiment of the present invention.
Figure 2J:
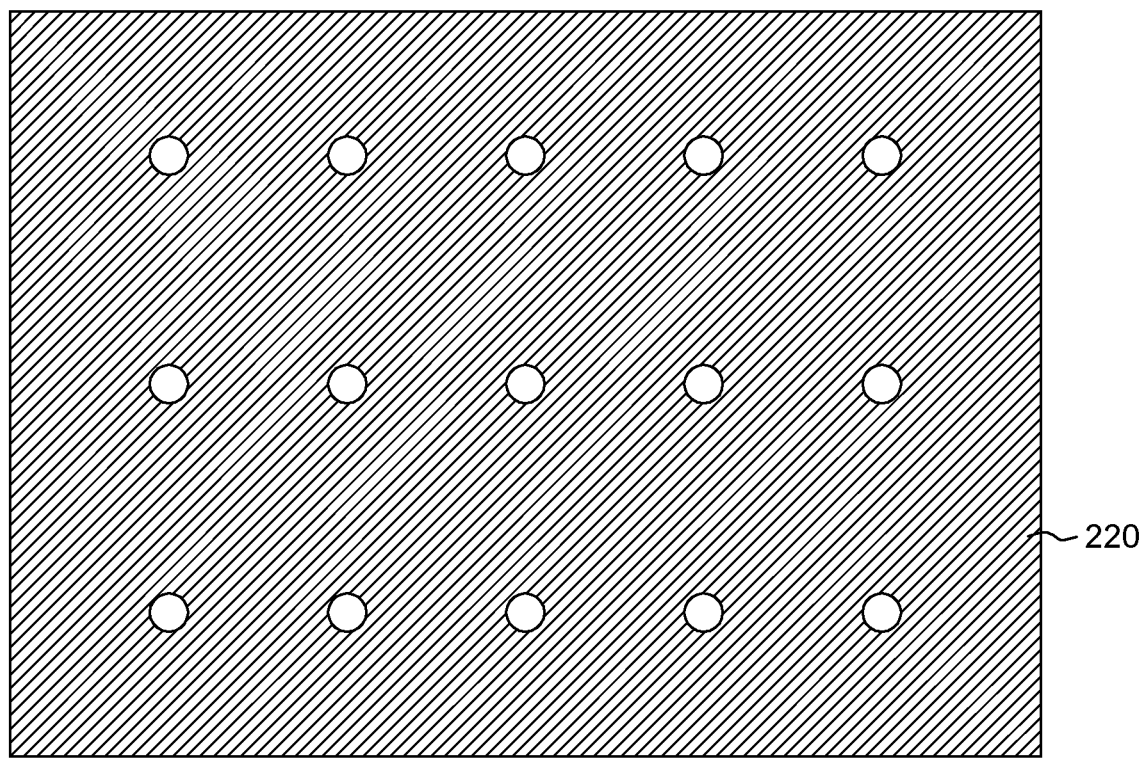
FIG. 2J is a top down view of a package according to an embodiment of the present invention.
Figure 2K:
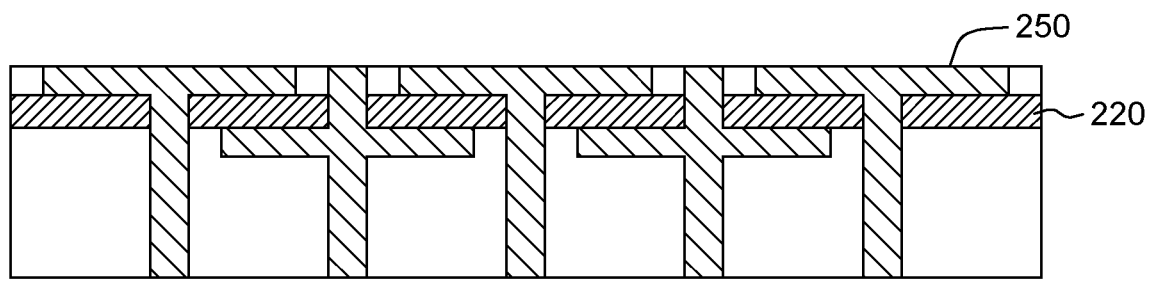
FIG. 2K is a cross-sectional front view a package according to an embodiment of the present invention.
Figure 2L:
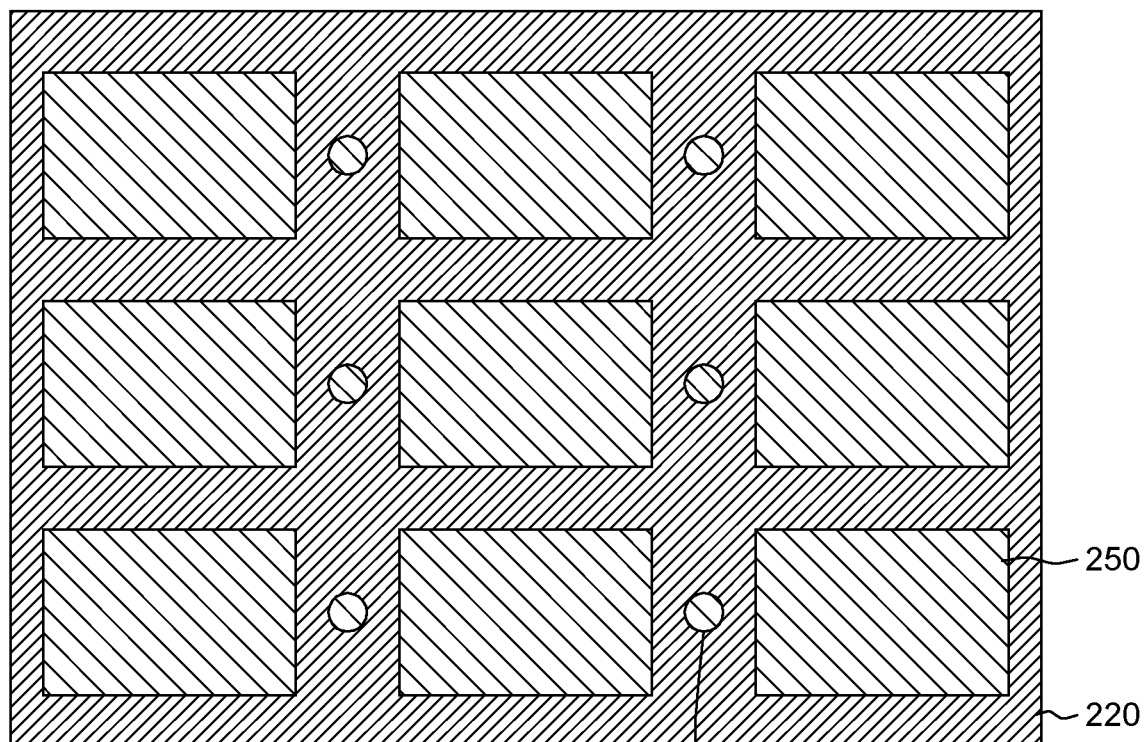
FIG. 2L is a top down view of a package according to an embodiment of the present invention.
Figure 2M:
FIG. 2M is a cross-sectional front view a package according to an embodiment of the present invention.
Figure 2N:
FIG. 2N is a top down view of a package according to an embodiment of the present invention.
Figure 2O:
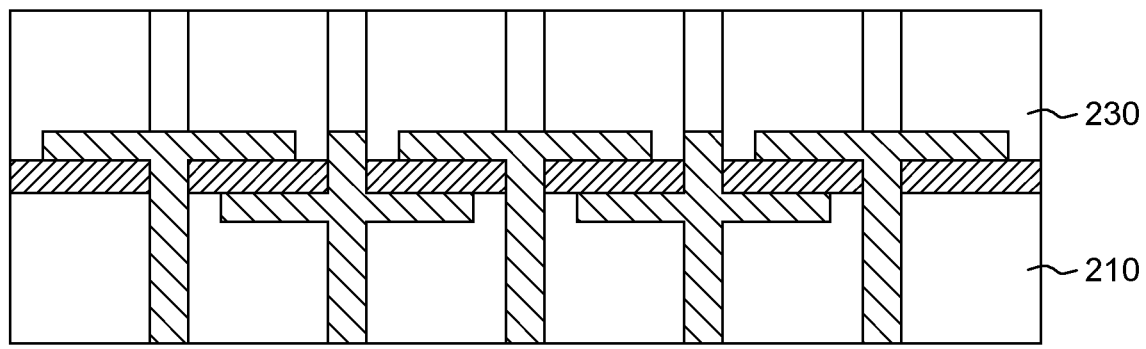
FIG. 2O is a cross-sectional front view a package according to an embodiment of the present invention.
Figure 2P:
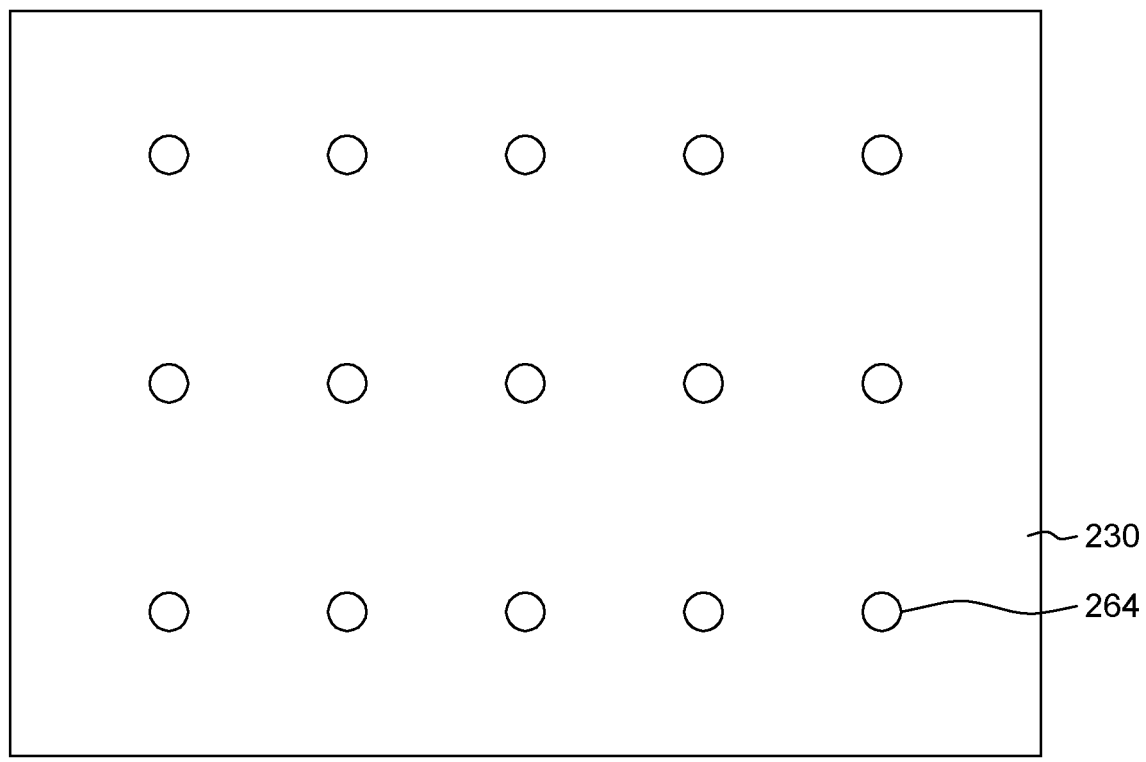
FIG. 2P is a top down view of a package according to an embodiment of the present invention.
Figure 2Q:
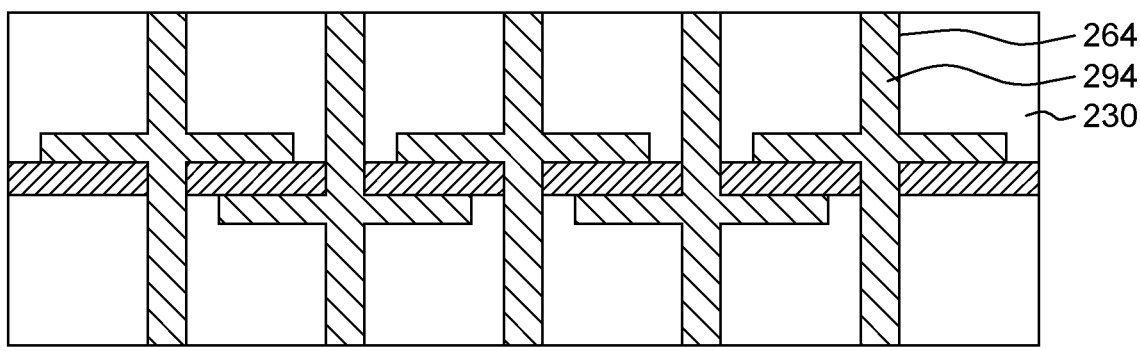
FIG. 2Q is a cross-sectional front view a package according to an embodiment of the present invention.
Figure 2R:
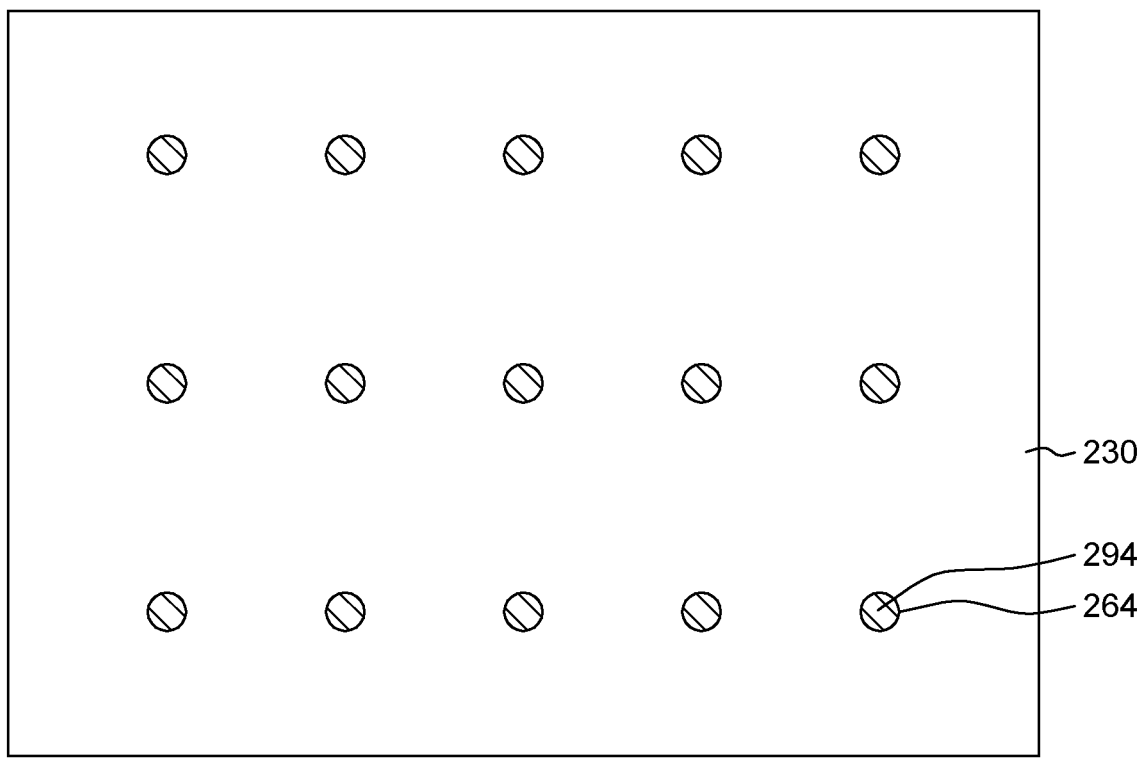
FIG. 2R is a top down view of a package according to an embodiment of the present invention.
Figure 2S:
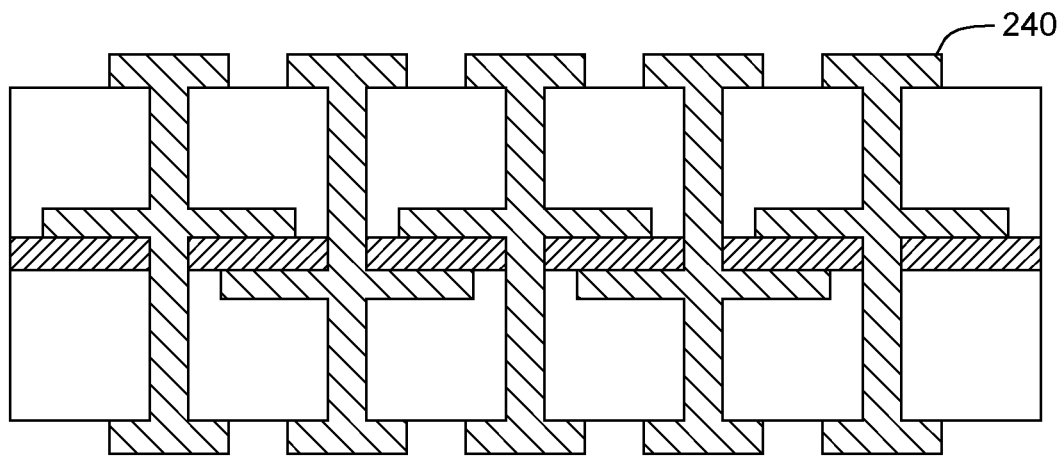
FIG. 2S is a cross-sectional front view a package according to an embodiment of the present invention.
Figure 2T:
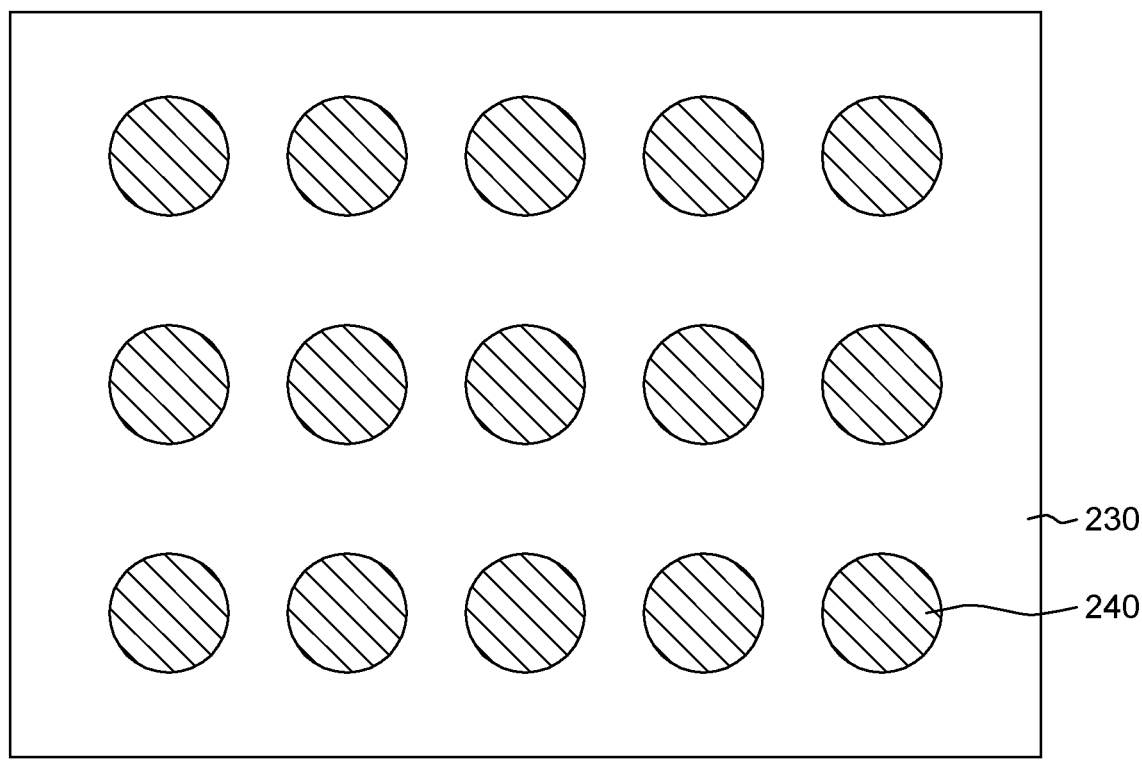
FIG. 2T is a top down view of a package according to an embodiment of the present invention.
Figure 3:
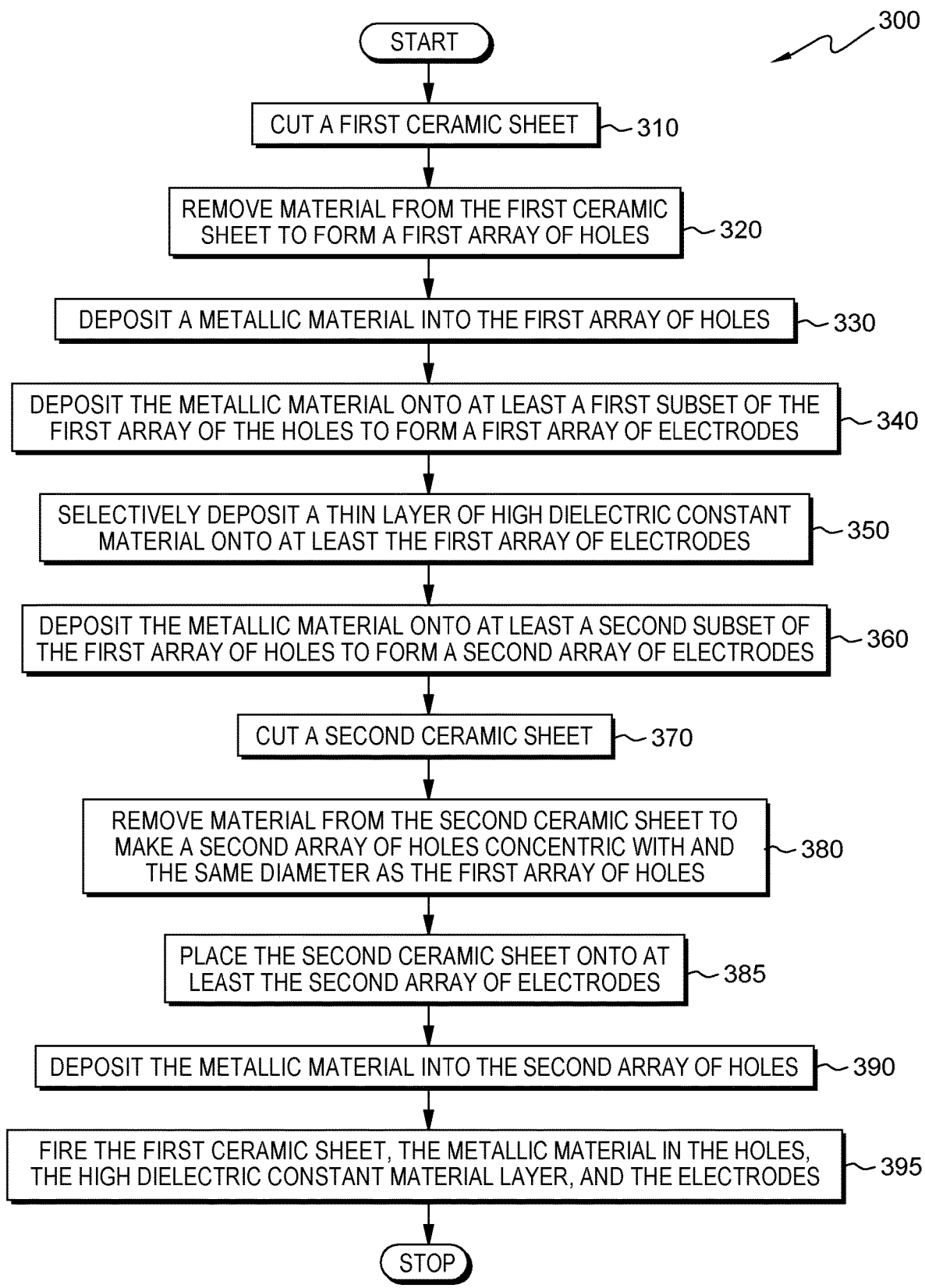
FIG. 3 is a flowchart according to an embodiment of the present invention.

Referring to FIG. 2A-2T and FIG. 3, in one embodiment the process includes a cutting step 310 of cutting a first ceramic sheet 210, a removing step 320 of removing material from the first ceramic sheet 210 to form a first array of holes 262, a depositing step 330 of depositing a metallic material 292 into the first array of holes, a depositing step 340 of depositing the metallic material onto at least a first subset of the first array of the holes 262 to form a first array of electrodes 272, a selectively depositing step 350 of selectively depositing a thin layer of high dielectric constant material 220 onto at least the first array of electrodes 272, a depositing step 360 of depositing the metallic material onto at least a second subset of the first array of holes 262 to form a second array of electrodes 250, a cutting step 370 of cutting a second ceramic sheet, a removing step 380 of removing material from the second ceramic sheet 230 to make a second array of holes 264 concentric with and having the same diameter as the first array of holes 262, a placing step 385 of after the removing material from the second ceramic sheet 230, placing the second ceramic sheet 230 onto at least the second array of electrodes 385, a depositing step 390 of depositing the metallic material into the second array of holes 390, and a firing step 395 of firing the first ceramic sheet 210, the metallic material in the first array of holes 262 and the second array of holes 264, the high dielectric constant material layer 220, and the electrodes 395. In a further embodiment, the thin layer of high dielectric constant material 220 is placed on both the first ceramic layer 210 and the first array of electrodes 272. In a further embodiment, the second array of electrodes 250 is placed on both a subset of the first array of holes and the thin layer of high dielectric constant material 220. In a further embodiment, second ceramic sheet 230 is placed onto the second array of electrodes and thin layer of high dielectric constant material 220. In an embodiment, the ceramic material is an LTCC, and the firing temperature is between 800 degrees Celsius and 1200 degrees Celsius.

In an embodiment, the order of process 300 does not need to be exactly as shown in FIG. 3. For example, depositing step 330 could be performed after depositing step 340 and after selectively depositing step 350.

In a further embodiment, removing step 320 and removing step 380 includes punching the holes in the ceramic sheet. In a further embodiment, one of cutting steps 310 and 370, removing steps 320 and 380, depositing steps 330, 340, 350, 360, and 390, and placing step 385 is repeated one or more times before firing step 395.

In a further embodiment, the metallic material is applied to a termination of the one or more holes, forming an application pad 240. In a further embodiment, selectively depositing step 350 includes depositing the high dielectric constant material 220 to at least the first array of electrodes via screen printing. In a further embodiment, firing step 395 results in the metallic material forming an electrically conductive structure.

In a further embodiment, the ceramic sheet includes a low temperature co-fired ceramic. In a further embodiment, the high dielectric constant material is a ceramic with a high dielectric constant.

In a further embodiment, process 300 further includes applying heat to the high dielectric constant material, thereby removing excess moisture from the high dielectric constant material, thereby solidifying the high dielectric constant material. In one embodiment, the applying heat is between 150 degrees Celsius and 200 degrees Celsius.

Figure 4:
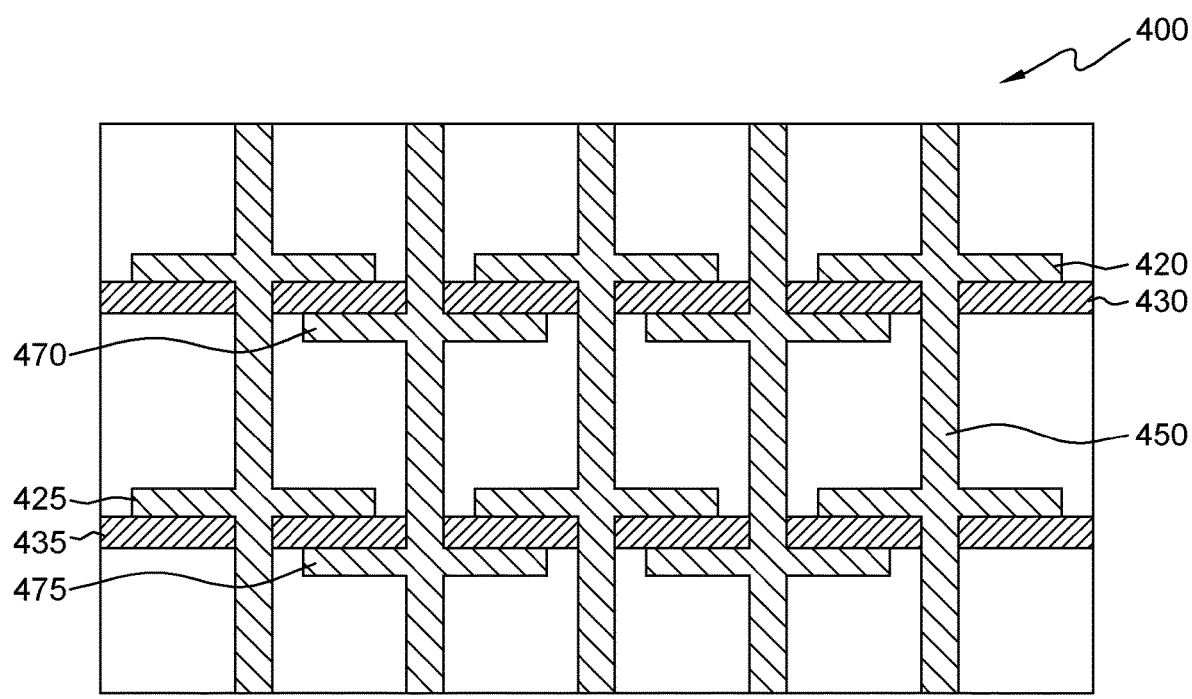
FIG. 4 is a cross-sectional view of a package according to an embodiment of the present invention.

Referring to FIG. 4. in one embodiment, a package includes a ceramic substrate 400, where the substrate 400 has two or more conductive pathways 450 formed in the ceramic substrate 400, two or more electrodes 420, 470, 425, 475 formed in the ceramic substrate 400, where each of electrode 420, 470, 425, 475 is physically connected to at least one of the two or more conductive pathways 450 forming a set, and at least one high dielectric constant layer 430 and 435 formed inside the ceramic substrate 400, formed between at least two of the two or more electrodes, and formed around the two or more conductive pathways. In one embodiment, the ceramic substrate can be formed of three ceramic layers 410, 440, and 460.

In a further embodiment, each of the sets is physically separated from at least one of the other sets. In a further embodiment, high dielectric constant layer 435 physically separates a first electrode layer 475 among the two or more electrodes from a second electrode layer 425 among the two or more electrodes. In FIG. 4, first electrode layer 475 includes 2 electrodes, and second electrode layer 425 includes three electrodes. In a further embodiment, high dielectric constant layer 430 physically separates a first electrode 470 among the two or more electrodes from a second electrode 420 among the two or more electrodes.

Figure 5:
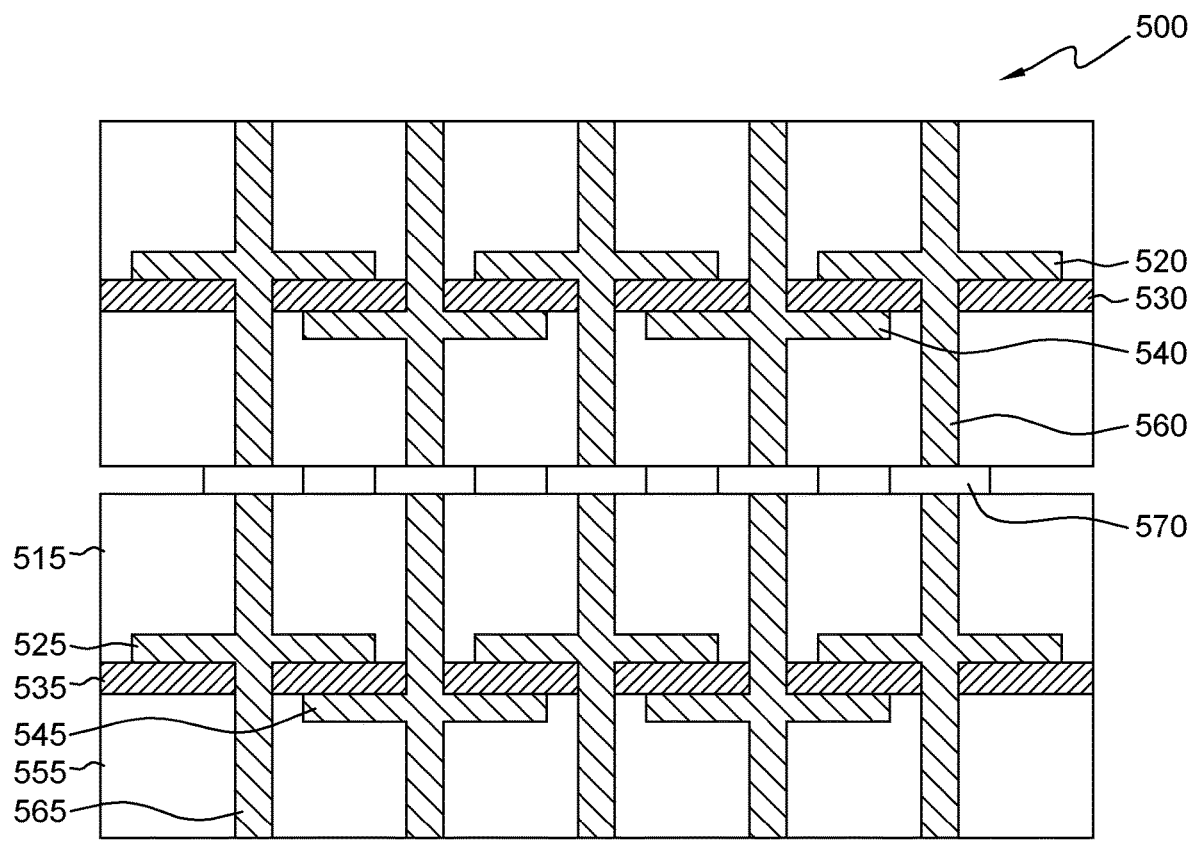
FIG. 5 is a cross-sectional view of a package according to an embodiment of the present invention.

Referring to FIG. 5, in one embodiment, the package is connected to another package that is at least similar to the package, thereby forming a multi package stack. In one exemplary embodiment, a first package is composed of two ceramic layers 550 and 510, two electrode layers with one or more electrodes 540 and 520 in each layer, and a high dielectric constant layer 530. A second package is composed of two ceramic layers 555 and 515, two electrode layers with one or more electrodes 545 and 525 in each layer, and a high dielectric constant layer 535. In one embodiment, first package and the second packages could be soldered together at the surface pads 570. In an alternative embodiment, the first package and the second package would be placed on top of each other before firing, and the connection pads 570 would be fused during firing.

Figure 6:
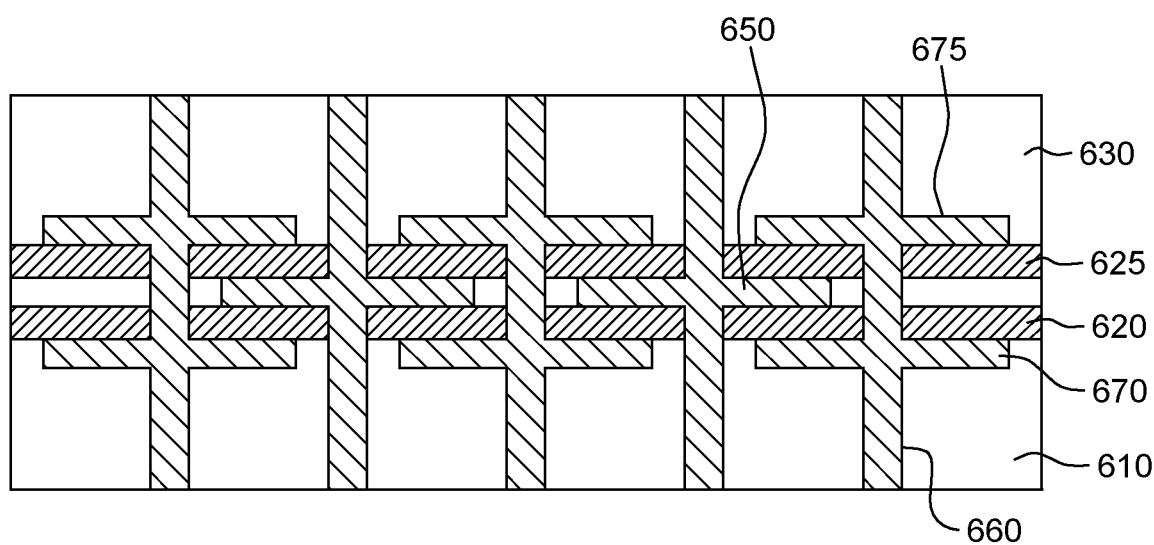
FIG. 6 is a flowchart according to an embodiment of the present invention.

Referring to FIG. 6, in one embodiment, the package contains more than two electrode layers and two or more high dielectric constant layers. In one embodiment, the substrate assembly includes a first ceramic layer 610, a first layer of one or more electrodes 670 connected to the ceramic layer 610, a first high dielectric constant layer 620 connected to the first layer of one or more electrodes 670, a second layer of one or more electrodes 650 connected to the first high dielectric constant layer 620, a second high dielectric constant layer 625 connected to the second layer of one or more electrodes 650, a third layer of one or more electrodes 675 connected to the second high dielectric constant layer 625, a second ceramic layer 630 connected to the third layer of one or more electrodes 675, two or more holes 660, where two or more holes 660 are formed through first ceramic layer 610, at least one electrode 670, 675, and 150, at least two high dielectric constant layers 620 and 625, and second ceramic layer 630, electrically conductive structures formed in two or more holes 660, and where the electrically conductive structure is physically connected to at least one of electrodes 670, 675, and 650, thereby forming a set, where each of the sets is physically separated from at least one of the other sets. In a further embodiment, the first high dielectric constant layer 620 is connected to the first ceramic layer 610 in addition to the first layer of electrodes 670. In a further embodiment, a second ceramic layer 630 is connected to the second layer of one or more electrodes 675 and the high dielectric constant layer 625. In a further embodiment, the second high dielectric constant layer 625 is connected to the first high dielectric constant layer 620 in addition to the second layer of electrodes 670.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed:

1. A substrate assembly comprising:
   a first ceramic layer;
   a first layer of one or more electrodes connected to the ceramic layer;
   a high dielectric constant layer connected to the first layer of one or more electrodes,
     wherein the high dielectric constant layer is composed of different material than the ceramic layer;
   a second layer of one or more electrodes connected to the high dielectric constant layer
     wherein the high dielectric constant layer is composed of direct contact with the first layer of one or more electrodes and the second layer of one or more electrodes;
   a second ceramic layer connected to the second layer of one or more electrodes,
     wherein the second ceramic layer is a different material than the high dielectric constant layer;
   two or more holes, wherein each of the two or more holes is formed through at least one ceramic layer, at least one layer of one or more electrodes, and at least one high dielectric constant layer; and
   electrically conductive structures formed in the two or more holes,
   wherein each of the electrically conductive structures is physically connected to at least one of the electrodes, thereby forming sets,
   wherein each of the sets is physically separated from at least one of the other sets.

2. The substrate assembly of claim 1 further comprising at least one additional layer of one or more electrodes, and one additional high dielectric constant layer.

3. The substrate assembly of claim 2 further comprising at least one additional ceramic layer.

4. The substrate assembly of claim 1, wherein the high dielectric constant layer has a thickness ranging from 1 μm to 10 μm.

5. The substrate assembly of claim 1, wherein the high dielectric constant layer is selected from the group consisting of strontium titanate and barium titanate.

6. The substrate assembly of claim 1 further comprising an electrically conductive surface pad at a termination of the two or more holes.

7. The substrate assembly of claim 1 wherein the high dielectric constant layer is the only material between the first layer of one or more electrodes and the second layer of one or more electrodes.

* * * * *